United States Patent
Hrusch et al.

(10) Patent No.: US 11,613,301 B2
(45) Date of Patent: Mar. 28, 2023

(54) MOTOR-ASSISTED STEERING GEARBOX

(71) Applicant: Schaeffler Technologies AG & Co. KG, Herzogenaurach (DE)

(72) Inventors: Nicholas Hrusch, Wooster, OH (US); Kyle DeHoff, Canal Fulton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 322 days.

(21) Appl. No.: 16/820,778

(22) Filed: Mar. 17, 2020

(65) Prior Publication Data

US 2020/0298903 A1 Sep. 24, 2020

Related U.S. Application Data

(60) Provisional application No. 62/822,393, filed on Mar. 22, 2019.

(51) Int. Cl.
*B62D 5/04* (2006.01)
*B62D 7/16* (2006.01)
*B62D 3/02* (2006.01)

(52) U.S. Cl.
CPC .............. *B62D 5/0421* (2013.01); *B62D 3/02* (2013.01); *B62D 7/16* (2013.01)

(58) Field of Classification Search
CPC ............ B62D 5/0421; B62D 3/02; B62D 7/16
See application file for complete search history.

(56) References Cited

U.S. PATENT DOCUMENTS

| | | | | |
|---|---|---|---|---|
| 4,434,680 | A | * 3/1984 | Riediger | F16H 47/04 475/23 |
| 4,527,653 | A | 7/1985 | Agarwal et al. | |
| 4,556,116 | A | * 12/1985 | O'Neil | B62D 5/0415 180/404 |
| 6,211,631 | B1 | 4/2001 | Wilson-Jones et al. | |
| 6,364,050 | B1 | 4/2002 | Horton | |
| 6,491,599 | B1 | * 12/2002 | Schmidt | B60K 6/445 475/8 |
| 2006/0278466 | A1 | 12/2006 | Cheng | |
| 2016/0096563 | A1 | * 4/2016 | Tigue | B62D 11/04 29/401.1 |

* cited by examiner

*Primary Examiner* — Kevin Hurley
*Assistant Examiner* — Michael R Stabley

(57) ABSTRACT

Power assisted steering systems provide a gear reduction of approximately 25:1 between a steering wheel and a steering mechanism and approximately 625:1 between an electric motor and a steering mechanism. The system is back-driveable from the steering mechanism. In one embodiment, the gear reduction is provided primarily by three planetary gear sets, with the remainder provided by axis transfer gearing. In another embodiment, the gear reduction is provided primarily by a cycloidal gear set, with the remainder provided by axis transfer gearing.

11 Claims, 2 Drawing Sheets

MOTOR-ASSISTED STEERING GEARBOX

CROSS-REFERENCE TO RELATED APPLICATIONS

This application claims priority to U.S. Provisional Application 62/822,393 filed Mar. 22, 2019, the entire disclosure of which is incorporated by reference herein.

TECHNICAL FIELD

The present disclosure relates to the field of electric power steering mechanisms for motor vehicles.

BACKGROUND

In large vehicles, the driver effort required to steer may be large. One way of reducing the steering effort is to provide a high gear ratio such that the driver turns the steering wheel through a large angle in order to change the steering angle a given amount. There are practical limits to this approach. Sometimes it is necessary to change the steering angle by a large amount. An excessive gear ratio would imply an excessive number of turns of the steering wheel to accomplish the necessary steering angle change. Also, an excessive gear ratio may adversely impact the driving feel, especially at high vehicle speeds. Therefore, various power-assisted steering systems have been developed. One type of power-assisted steering system utilizes an electric motor linked to the steering mechanism. When a controller detects a torque being applied by the driver, it commands the electric motor to exert a torque which is added to the torque applied by the driver. The ratio of electric motor torque to driver applied torque may vary based on vehicle speed or other parameters.

Some mechanisms which provide a high gear reduction ratio, such as worm gears, do not transmit torque in the opposite direction. Instead, they act as locks when driven from the speed-reduced end. Such mechanisms are problematic in a steering system because the system should return to neutral in response to forces on the vehicle tires when input torque on the steering system is removed.

In autonomous vehicles, the controller directly steers the vehicle without a driver turning the steering wheel. In some cases, the steering wheel may be physically removed.

SUMMARY

A power-assisted steering system includes an intermediate element and three sets of reduction gearing. The reduction gearing may be back-driveable. The first reduction gearing, which has a first reduction ratio, driveably connects the rotor of an electric motor to the intermediate element. The second reduction gearing, which has a first reduction ratio, driveably connects a steering wheel to the intermediate element. The third reduction gearing, which has a third reduction ratio, driveably connects the intermediate element to a steering mechanism. A product of the first reduction ratio and the third reduction ratio may be between 500:1 and 750:1. A product of the second reduction ratio and the third reduction ratio may be between 20:1 and 30:1. A ratio of the first reduction ratio to the second reduction ratio may be between 20:1 and 30:1.

A power-assisted steering system includes three planetary gear sets. The first planetary gear set has a first sun gear driveably connected to a rotor of a motor, a first ring gear held against rotation, a first carrier, and a plurality of first planet gears. The rotor may be fixed to the first sun gear. Each first planet gear is supported for rotation with respect to the first carrier and meshes with the first sun gear and the first ring gear. The second planetary gear set has a second sun gear fixed to the first carrier, a second ring gear driveably connected to a steering wheel, a second carrier held against rotation, and a plurality of second planet gears. The steering wheel may fixed to a first axis transfer gear. The second ring gear may be fixed to a second axis transfer gear meshing with the first axis transfer gear. Each second planet gears is supported for rotation with respect to the second carrier and meshes with the second sun gear and the second ring gear. The third planetary gear set has a third sun gear fixed to the second ring gear, a third ring gear held against rotation, a third carrier driveably connected to a steering mechanism, and a plurality of third planet gears. The third carrier may be fixed to a third axis transfer gear. The steering mechanism may be fixed to a fourth axis transfer gear meshing with the third axis transfer gear. Each third planet gears is supported for rotation with respect to the third carrier and meshes with the third sun gear and the third ring gear.

A power-assisted steering system includes a cycloidal gear set having an eccentric disk, a cycloidal disk, a ring gear, and an output disk. The cycloidal gear set is configured to establish a fixed speed ratio between the eccentric disk and the output disk. The eccentric disk is driveably connected to a rotor of a motor. The rotor may be fixed to the eccentric disk. The ring gear is held against rotation. The output disk is driveably connected to a steering mechanism and also driveably connected to a steering wheel. The steering wheel may be fixed to a first axis transfer gear. The output disk may be fixed to a second axis transfer gear meshing with the first axis transfer gear. The output disk may be fixed to a third axis transfer gear. The steering mechanism may be fixed to a fourth axis transfer gear meshing with the third axis transfer gear.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
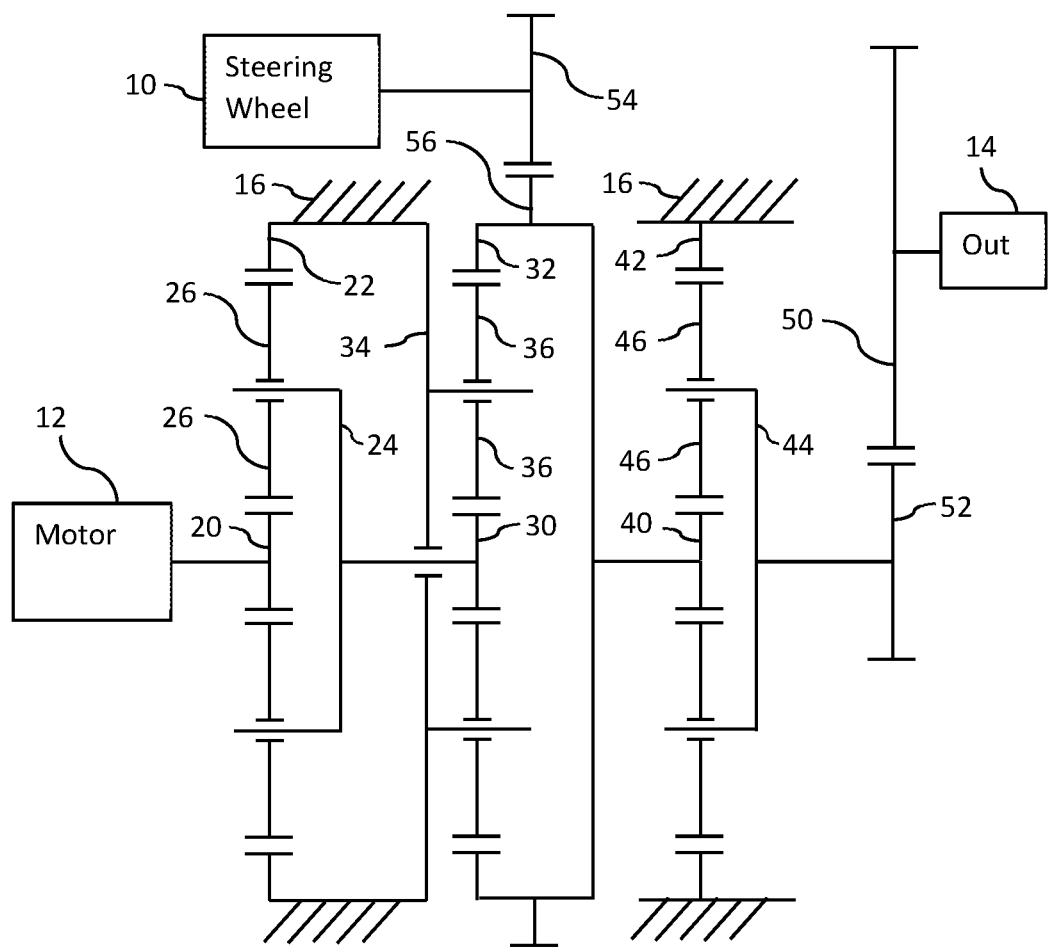
FIG. 1 is a schematic illustration of a first motor assisted steering gearbox.

In an electric motor-assisted steering system, a high gear ratio between the rotor and the steering mechanism permits use of a smaller electric motor. FIG. 1 illustrates a first motor-assisted steering gearbox linking a steering wheel 10 and the rotor of an electric motor 12 to a steering mechanism 14. The gearbox uses three planetary gear sets and two parallel axis gear pairs. These components are supported within a housing 16 which is fixed to vehicle structure.

The first planetary gear set includes sun gear 20, ring gear 22, carrier 24, and a set of planet gears 26. Ring gear 22 is fixed to housing 16. Sun gear 20 and carrier 24 are supported for rotation about a central axis. Each of the planet gears 26 is supported for rotation with respect to carrier 24. External gear teeth of each planet gear 26 mesh with external gear teeth of sun gear 20 and with internal gear teeth of ring gear 22. Sun gear 20 is fixedly coupled to the rotor of motor 12. The gear ratio between sun gear 20 and carrier 24 is $(N_{22}+N_{20})/N_{20}$ where $N_{20}$ and $N_{22}$ are the number of gear teeth on sun gear 20 and ring gear 22 respectively. The inventors recommend choosing tooth numbers to establish a gear reduction ratio of 5.926:1.

The second planetary gear set includes sun gear 30, ring gear 32, carrier 34, and a set of planet gears 36. Sun gear 30 and ring gear 32 are supported for rotation about the central axis. Sun gear 30 is fixedly coupled to carrier 24. Carrier 34 is fixed to housing 16. Each of the planet gears 36 is supported for rotation with respect to carrier 34. External gear teeth of each planet gear 36 mesh with external gear teeth of sun gear 30 and with internal gear teeth of ring gear 32. The gear ratio between sun gear 30 and ring gear 32 is $-N_{32}/N_{30}$ where $N_{30}$ and $N_{32}$ are the number of gear teeth on sun gear 30 and ring gear 32 respectively. The inventors recommend choosing tooth numbers to establish a gear reduction ratio of 4.926:1. The gears of the second planetary gear set may be identical in design to the corresponding gears of the first planetary gear set.

The third planetary gear set includes sun gear 40, ring gear 42, carrier 44, and a set of planet gears 46. Ring gear 42 is fixed to housing 16. Sun gear 40 and carrier 44 are supported for rotation about the central axis. Each of the planet gears 46 is supported for rotation with respect to carrier 44. External gear teeth of each planet gear 46 mesh with external gear teeth of sun gear 40 and with internal gear teeth of ring gear 42. Sun gear 40 is fixedly coupled to ring gear 32. The gear ratio between sun gear 40 and carrier 44 is $(N_{42}+N_{40})/N_{40}$ where $N_{40}$ and $N_{42}$ are the number of gear teeth on sun gear 40 and ring gear 42 respectively. The inventors recommend choosing tooth numbers to establish a gear reduction ratio of 4.686:1. Due to the torque multiplication provided by the first and second gear sets, the gears of the third gear set must be designed to handle substantially more torque than the corresponding gears of the first and second gear sets.

Output gear 50 is supported for rotation about an axis parallel to the central axis. Gear 52 is supported for rotation about the common axis and is fixedly coupled to carrier 44. This parallel axis gear pair provides a gear ratio of $-N_{50}/N_{52}$ where $N_{50}$ and $N_{52}$ are the number of gear teeth on gears 50 and 52 respectively. The inventors recommend choosing tooth numbers to establish a gear reduction ratio of 4.545:1. With the recommended tooth numbers, the overall gear ratio between motor 12 and the steering mechanism is 5.926*4.926*4.686*4.545=622:1. If the gearing has an efficiency of 85%, an electric motor torque of 15 Nm generates a steering torque of 7927 Nm.

Steering wheel input gear 54 is supported for rotation about another axis parallel to the central axis. Gear 56 is supported for rotation about the common axis and is fixedly coupled to ring gear 32 and sun gear 40. This parallel axis gear pair provides a gear ratio of $-N_{56}/N_{54}$ where $N_{54}$ and $N_{56}$ are the number of gear teeth on gears 54 and 56 respectively. The inventors recommend choosing tooth numbers to establish a gear reduction ratio of 1.175:1. With the recommended tooth numbers, the overall gear ratio between steering wheel 10 and the steering mechanism is 1.175*4.686*4.545=25:1.

Figure 2:
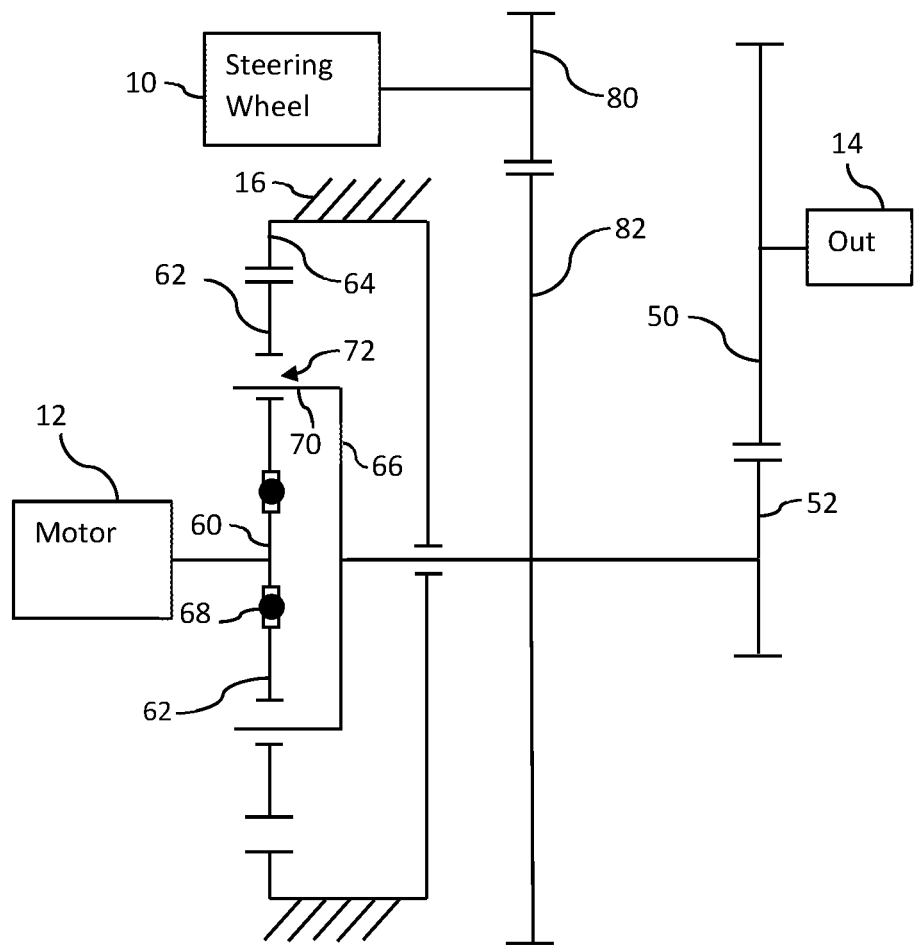
FIG. 2 is a schematic illustration of a second motor assisted steering gearbox.

FIG. 2 illustrates a second motor-assisted steering gearbox linking steering wheel 10 and the rotor of electric motor 12 to steering mechanism 14. The gearbox uses a cycloidal gear set and two parallel axis gear pairs. These components are supported within a housing 16 which is fixed to vehicle structure.

The cycloidal gear set includes eccentric disk 60, cycloidal disk 62, ring gear 64, and driven disk 66. Ring gear 64 is fixed to housing 16. Eccentric disk 60 is round and is fixedly coupled to the rotor of motor 12. However, the rotor shaft is not fixed to the center of eccentric disk 60. Cycloidal disk 62 is supported by eccentric disk 60 via bearings 68. The bearings permit low friction relative rotation between eccentric disk 60 and cycloidal disk 62. The centers of eccentric disk 60 and cycloidal disk 62 both rotate around the axis of the rotor of motor 12 as the rotor rotates. Cycloidal disk 62 has a number of external gear teeth $N_{62}$ that mesh with a number of internal gear teeth $N_{64}$ of ring gear 64. Driven disk 66 is supported for rotation about the same axis as the rotor of motor 12. Driven disk 66 includes a number of pins 70 that extend through holes 72 in cycloidal disk 62. The gear ratio between eccentric disk 60 and driven disk 66 is $N_{62}/(N_{64}-N_{62})$. The inventors recommend choosing number of teeth such that the ratio is 100:1.

With a single cycloidal disk, the cycloidal drive is not balanced. Therefore, additional eccentric disks and cycloidal disks may be added in a manner that balances the overall device.

Gears 82 and 52 are fixedly coupled to driven disk 66. Gears 80 and 50 are each supported for rotation about parallel axes offset from the axis of the rotor of motor 12 and offset from one another. Gear 80 meshes with gear 82 and is fixedly coupled to the steering wheel. The inventors recommend choosing tooth number for gears 80 and 82 to produce a gear ratio of 4:1. Gear 50 meshes gear 52 and is fixedly coupled to steering mechanism. The inventors recommend choosing tooth number for gears 50 and 52 to produce a gear ratio of 6.25:1. At the recommended tooth numbers, the overall gear ratio between motor 12 and the steering mechanism 14 is 625:1 and the overall gear ratio between steering wheel 10 and steering mechanism 14 is 25:1.

The two embodiments described above have several characteristics in common. Both have an axis transfer gear, 56 and 82 respectively, that is an intermediate element between the motor and the output and also between the steering wheel and the output. A first reduction gear connects the motor to the intermediate element. A second reduction gear connects the steering wheel to the intermediate element. Finally, a third reduction gear connects the intermediate element to the output. In both embodiments, the overall ratio between the motor and the output is about 625:1 and the overall ratio between the steering wheel and the output is about 25:1.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A power-assisted steering system comprising:
   an intermediate element;
   first reduction gearing driveably connecting a rotor of a motor to the intermediate element;
   second reduction gearing driveably connecting a steering wheel to the intermediate element; and
   third reduction gearing driveably connecting the intermediate element to a steering mechanism,
   wherein the intermediate element is a first axis transfer gear supported for rotation about an axis of rotation of the rotor.

2. The power-assisted steering system of claim 1, wherein the second reduction gearing comprises a second axis transfer gear fixed to the steering wheel and meshing with the first axis transfer gear.

3. The power-assisted steering system of claim 2 wherein the first reduction gearing comprises:
   a first planetary gear set having a first sun gear fixed to the rotor, a first ring gear held against rotation, a first carrier, and a plurality of first planet gears, each first planet gears supported for rotation with respect to the first carrier and meshing with the first sun gear and the first ring gear; and
   a second planetary gear set having a second sun gear fixed to the first carrier, a second ring gear fixed to the intermediate element, a second carrier held against rotation, and a plurality of second planet gears, each second planet gears supported for rotation with respect to the second carrier and meshing with the second sun gear and the second ring gear.

4. The power-assisted steering system of claim 3 wherein the third reduction gearing comprises:
   a third planetary gear set having a third sun gear fixed to the intermediate element, a third ring gear held against rotation, a third carrier, and a plurality of third planet gears, each third planet gears supported for rotation with respect to the third carrier and meshing with the third sun gear and the third ring gear; and
   a third axis transfer gear fixed to the third carrier and meshing with a fourth axis transfer gear fixed to the steering mechanism.

5. The power-assisted steering system of claim 1 wherein:
   the first reduction gearing has a first reduction ratio;
   the second reduction gearing has a second reduction ratio; and
   a ratio of the first reduction ratio to the second reduction ratio is between 20:1 and 30:1.

6. The power-assisted steering system of claim 1 wherein:
   the first reduction gearing has a first reduction ratio;
   the second reduction gearing has a second reduction ratio;
   the third reduction gearing has a third reduction ratio;
   a product of the first reduction ratio and the third reduction ratio is between 500:1 and 750:1; and
   a product of the second reduction ratio and the third reduction ratio is between 20:1 and 30:1.

7. The power-assisted steering system of claim 1 wherein first reduction gearing, second reduction gearing, and third reduction gearing are each back-drivable.

8. A power-assisted steering system comprising:
   a first planetary gear set having a first sun gear driveably connected to a rotor of a motor, a first ring gear held against rotation, a first carrier, and a plurality of first planet gears, each first planet gears supported for rotation with respect to the first carrier and meshing with the first sun gear and the first ring gear;
   a second planetary gear set having a second sun gear fixed to the first carrier, a second ring gear driveably connected to a steering wheel, a second carrier held against rotation, and a plurality of second planet gears, each second planet gears supported for rotation with respect to the second carrier and meshing with the second sun gear and the second ring gear; and
   a third planetary gear set having a third sun gear fixed to the second ring gear, a third ring gear held against rotation, a third carrier driveably connected to a steering mechanism, and a plurality of third planet gears, each third planet gears supported for rotation with respect to the third carrier and meshing with the third sun gear and the third ring gear.

9. The power-assisted steering system of claim 8 wherein the rotor is fixed to the first sun gear.

10. The power-assisted steering system of claim 8 wherein:
    the steering wheel is fixed to a first axis transfer gear; and
    the second ring gear is fixed to a second axis transfer gear meshing with the first axis transfer gear.

11. The power-assisted steering system of claim 8 wherein:
    the third carrier is fixed to a third axis transfer gear; and
    the steering mechanism is fixed to a fourth axis transfer gear meshing with the third axis transfer gear.

* * * * *